C. E. BOWN.
TOOL HOLDER.
APPLICATION FILED OCT. 30, 1905. RENEWED JAN. 20, 1909.
913,804.
Patented Mar. 2, 1909.
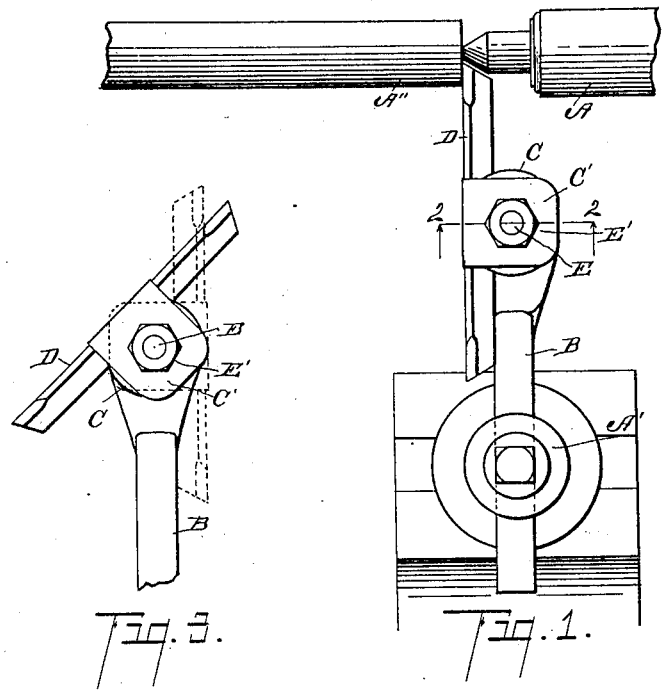
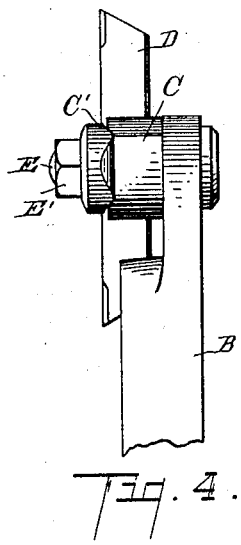
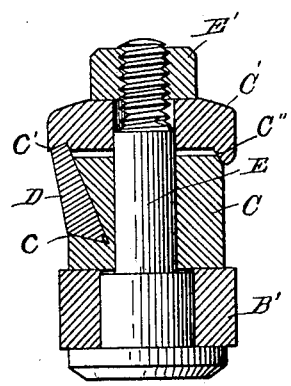
Witnesses:
Inventor,
Charles E. Bown
By Chappell & Earl
Att'ys

UNITED STATES PATENT OFFICE.

CHARLES E. BOWN, OF BATTLE CREEK, MICHIGAN, ASSIGNOR TO THE BOWN MACHINE COMPANY, LTD., OF BATTLE CREEK, MICHIGAN.

TOOL-HOLDER.

No. 913,804.      Specification of Letters Patent.      Patented March 2, 1909.

Application filed October 30, 1905, Serial No. 285,152. Renewed January 20, 1909. Serial No. 473,265.

*To all whom it may concern:*

Be it known that I, CHARLES E. BOWN, a citizen of the United States, residing at the city of Battle Creek, county of Calhoun, State of Michigan, have invented certain new and useful Improvements in Tool-Holders, of which the following is a specification.

This invention relates to improvements in tool holders.

The objects of this invention are: First, to provide an improved tool holder which may be adjusted to hold a tool for either right or left hand straight work, or right or left hand angle work. Second, to provide an improved tool holder embodying these advantages which is very simple in structure and one which may be very quickly and easily adjusted to any desired position.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing forming a part of this specification, in which—

Figure 1 is a detail plan of a structure embodying the features of my improved tool holder, the same being shown in position with a tool post of a lathe, and a piece of work being shown to indicate its operative position. Fig. 2 is an enlarged vertical section, taken on a line corresponding to line 2—2 of Fig. 1, looking in the direction of the little arrows at the ends of the section line, the bolt E being shown in full lines. Fig. 3 is a detail plan showing the relation of the parts when adjusted to hold a tool at an angle. Fig. 4 is a detail side elevation of my improved tool holder.

In the drawings, similar letters of reference refer to similar parts throughout the several views.

Referring to the drawings, A represents a spindle of a lathe, A' a tool post, and A" a piece of work. The forward end of the shank B is provided with a seat B' adapted to receive the head.

The head of my improved tool holder consists of the members C and C' which are pivoted to the shank by the bolt B' which is arranged vertically therethrough. The head member or section C rests upon the shank and is perforated to receive the bolt E. The head member C' which is also perforated to receive the bolt, rests upon the head member C. A nut E' clamps these members together and to the shank in any position to which they may be adjusted. A groove-like tool seat c is formed in one side of the head member C. This seat is formed so that the planes of its side and bottom intersect at an acute angle. A tool receiving groove c' is formed on the under side of the upper head member C'. On the side of the upper head member opposite to this groove is a downwardly projecting flange adapted to engage the lower head member. The inner face of this flange is inclined so that when the nut E' is tightened to clamp the parts of the head upon a tool, the tendency is to draw the tool firmly into its seat. This flange also holds the members of the head in proper relation to each other.

I preferably shape the tool, as D, with its upper and lower edges diverging inwardly as this construction fits the peculiar form of seat I have illustrated.

It is evident that the head of my improved tool holder may be swung or adjusted to bring the tool into proper position for either right or left hand work, and where a double-ended tool is used, it is not necessary to remove the tool from the holder, to secure the adjustment, it is only necessary to loosen the clamp nut E' and swing the head to the proper position. It is also evident that the head may be adjusted to bring the tool to any desired angle either right or left hand. This adjustment can be accomplished very quickly. The tool is held by my improved holder in a very rigid and secure manner.

Although my improved tool holder is very simple in construction, it is very strong in proportion to the weight of the material used, and is also quite economical to manufacture.

I have illustrated the bolt E as a means for securing the head members together and clamping them to the shank. It is evident that the post might be formed on the shank integral therewith, the bolt, however, is preferred by me on account of its economy.

Having thus described my invention, what

I claim as new and desire to secure by Letters Patent, is:

1. In a tool holder, the combination with a shank having a seat at its forward end; a head member arranged to rest on said seat, said head member having a tool seat formed in one side thereof, the planes of the side and bottom of which are made at an acute angle; a co-acting head member having a downwardly facing tool-engaging groove therein located over said seat and a downwardly projecting flange on its edge opposite to said tool engaging groove adapted to engage the edge of the other head member, the said edge being beveled to receive said flange; a bolt arranged through said head seat and head members; and a nut for said bolt whereby said head members may be clamped upon the tool and may be clamped in their adjusted positions on said head seat, for the purpose specified.

2. In a tool holder, the combination with a shank having a seat at its forward end; a head member arranged to rest on said seat, said head member having a tool seat formed in one side thereof, the planes of the side and bottom of which are made at an acute angle; a co-acting head member having a downwardly facing tool-engaging groove therein located over said seat and a downwardly projecting flange on its edge opposite to said tool-engaging groove adapted to engage the edge of the other head member; a bolt arranged through said head seat and head members; and a nut for said bolt whereby said head members may be clamped upon the tool and may be clamped in their adjusted positions on said head seat, for the purpose specified.

3. The combination with a shank having a seat at its forward end; a pair of head members having opposed tool-engaging seats and grooves therein, one of said head members arranged to rest on said seat, and the other to rest upon the head resting on said seat; a bolt arranged through said seat and said head members whereby said head members may be swung to any desired position on said seat; and a nut for said bolt whereby said head members may be clamped upon the tool, and in their adjusted positions on said seat, for the purpose specified.

In witness whereof, I have hereunto set my hand and seal in the presence of two witnesses.

CHARLES E. BOWN. [L. S.]

Witnesses:
 JENNIE IRENE KULP,
 FRANCIS A. KULP.